June 4, 1968    M. H. BUTLER    3,386,308
BOAT CONTROLLERS
Filed Jan. 3, 1966
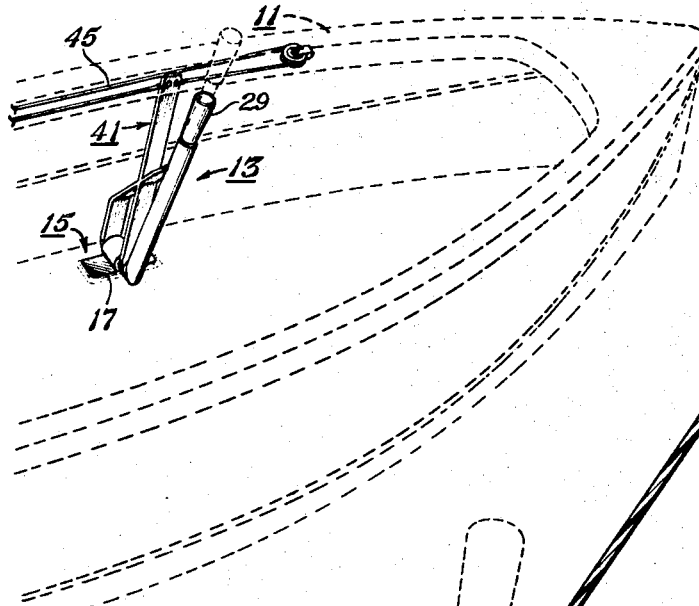
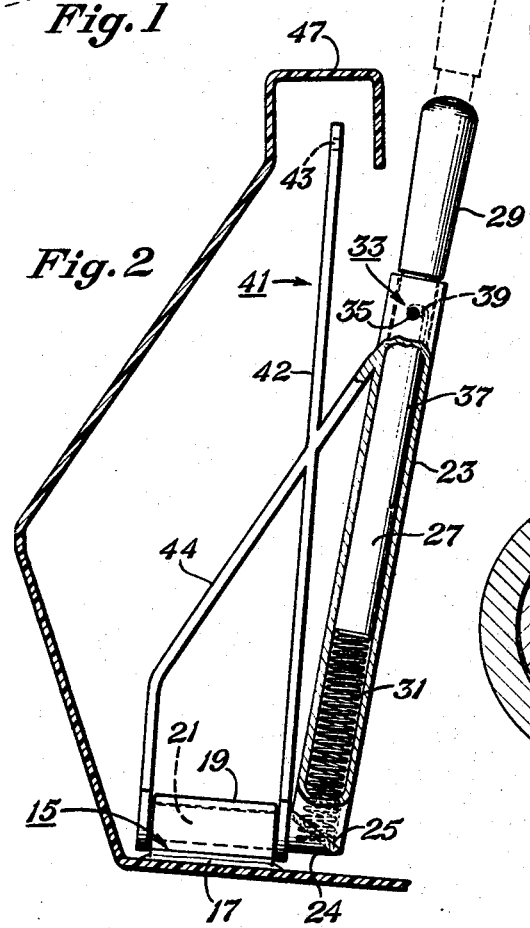
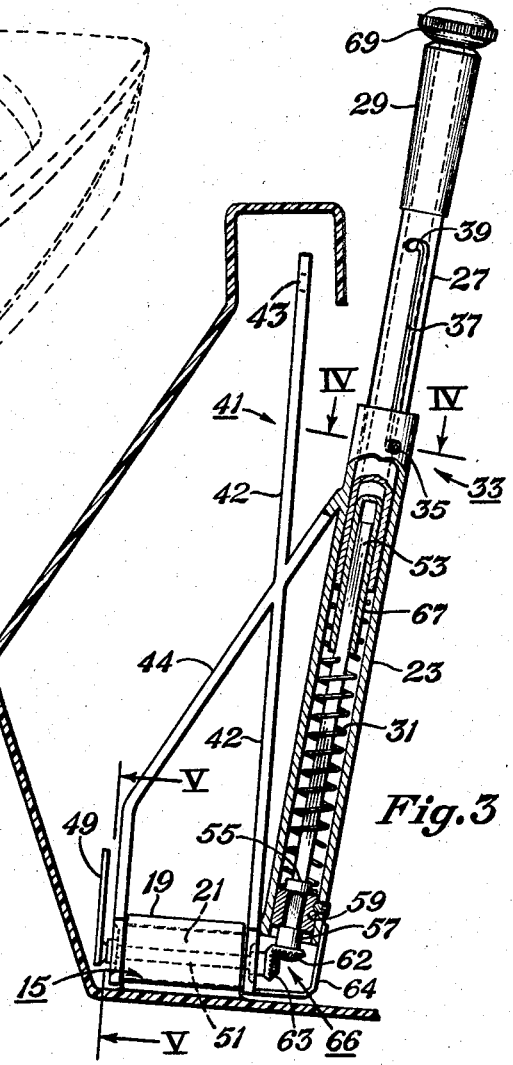
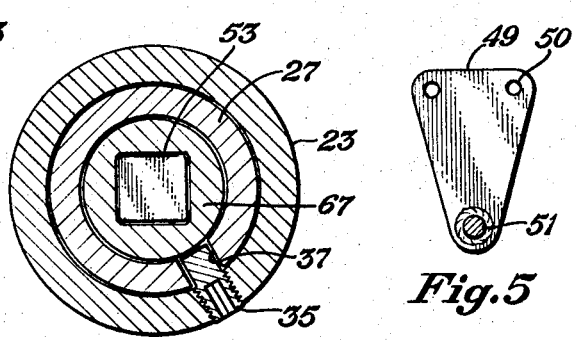
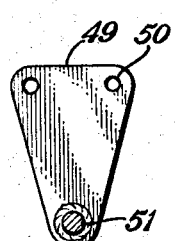
INVENTOR
Maurice H. Butler
BY
Wofford & Felsman
ATTORNEY ent Office 3,386,308
Patented June 4, 1968

3,386,308
BOAT CONTROLLERS
Maurice H. Butler, 807 E. Tucker Blvd.,
Arlington, Tex. 76010
Filed Jan. 3, 1966, Ser. No. 518,402
6 Claims. (Cl. 74—480)

ABSTRACT OF THE DISCLOSURE

Following is disclosed a boat controller having a reciprocable handle element in a control arm pivotally secured by means of a rotatable element inserted into a mounting means secured to a boat. The rotatable element extends through the mounting means and receives a bracket member that is connected with a steering control line attachment arm, the arm extending upward along the length of the control arm and handle element to receive steering cables. A modified form of boat controller has the handle element reciprocally secured to a drive rod rotated thereby to in turn rotate a pair of gears, one of which is seured to a shaft secured in the rotatable element. The end of the shaft opposite the gear receives an output plate for connection to a throttle control line.

---

There are a number of previously known means for steering boats, the more sophisticated of which enable boat operators to be remotely located from the rudders. Steering wheels, for example, are frequently secured to a forward region of a boat hull and to steering control lines that communicate with a motor attached to a rear region of the hull. Other means include levers (sometimes called joy sticks) that are pivotally secured to boat hulls, and attached to the steering control lines.

Not infrequently, steering wheels are impracticable when utilized in boats because of disadvantageous and troublesome space consumption, high costs, or installation complexities. The single lever or joy stick control means overcomes some of the disadvantages encountered in the adaptation and utilization of steering wheels as boat controllers. And yet, the single lever controller has significant disadvantages that impair their practiability or utility. If, for instance, the single lever controller is made relatively short in the interest of saving materials, costs or space, then the effort required to move it and steer the boat can be quite large. On the other hand, if the single lever is made long, then it may interfere with normal passenger activities.

While considering the problems, including those mentioned above, encountered in trying to originate more satisfactory boat controllers, I recognized the need for a boat controller of the lever type which, during steering maneuvers, would be long enough to effect easier handling, but which would not interfere with passenger activities when not in use.

It is the general object of my invention to provide improved boat controllers.

Another object of my invention is to provide lever type boat controllers which enable boats to be easily steered and yet which, when not in use, are less likely to interfere with normal passenger activities.

Another object of my invention is to provide a boat controller with a structure such that the steering control cables of the boat may be attached to the controller in a manner that lessens the chances for interference with passenger activity.

Another object of my invention is to provide a boat controller which enables easy steering of the boat, which is less likely to interfere with passenger activities in the boat, and which may be used to control the velocity as well as the direction of travel of the boat.

These and other objects are effected by my invention as will be apparent from the following description taken in accordance with the accompanying drawing, forming a part of this application, in which:

FIG. 1 is a perspective view showing a portion of a boat in phantom and one form of my boat controller assembled therein;

FIG. 2 is a front elevational view of the boat controller of FIG. 1 with a portion of the boat shown in fragmentary cros section;

FIG. 3 is a front elevational view of a modified form of my boat controller, with a portion of the boat shown in fragmentary cross section;

FIG. 4 is a sectional view as seen looking along the lines IV—IV of FIG. 3; and

FIG. 5 is a sectional view as seen looking along the lines V—V of FIG. 3.

The numeral 11 in the drawing designates a boat of the outboard motor type having a boat controller 13 assembled therein. The boat controller has a mounting means 15 which in this instance is securable to the bottom of the boat. Mounting means 15 includes a plate 17 which may be secured to the bottom of a boat with an epoxy resin or other suitable attachment means. Also, mounting means 15 includes a cylindrical housing 19 which carries a rotatable element 21 and which is oriented to rotate about a substantially horizontal axis that is transverse with respect to the length of the boat.

A control arm 23 has an L-shaped end 24 connected with rotatable element 21, the L-shaped end and the length of the arm being joined by suitable means such as weld 25. In this instance the control arm is a tubular sleeve that extends upwardly from the interior region of the boat to receive a handle element 27. Handle element 27 has a grip 29 on its upper end and is thus conveniently grasped by the person controlling the boat. Moreover, handle element 27 is axially slidable within the control arm 23 and a resilient element 31 (here a compression spring) communicates with the lower portions of both handle element 27 and control arm 23 to urge the handle element toward the extended position shown in phantom in FIGS. 1 and 2.

Locking means 33 are provided so that the handle element may be locked in the retracted position shown in FIGS. 1 and 2. In this instance, the locking means includes a pin 35 which is secured in an aperture in an upper region of the control arm 23 and which extends into engagement with a slot 37 formed lengthwise along a portion of the length of handle element 27. An upper region of the slot 39 extends a short distance circumferentially around the handle element 27 so that when fully depressed, the handle element may be rotated counterclockwise as seen from above and released so that the pin 35 engages the circumferential upper region 39 of the slot to lock the handle means in its retracted position.

Attachment means 41 are interposed between and secured to rotatable element 21 and control arm 23 by suitable means such as welding. The attachment means is in this instance a steering control line attachment arm 42 having apertures 43 in an upper region thereof through which are threaded and secured the steering control lines 45 (see especially FIG. 1). Steering control line attachment arm 42 extends upwardly into a region just beneath the gunnel 47 of the boat, and a bracket 44 extends from the rotatable element 21 into engagement with attachment arm 42 and handle element 27. There are a number of steering control line arrangements used in boats and my invention may be utilized with essentially any arrangement and is not limited to use with the particular arrangement shown in FIGS. 1 and 2.

To operate the boat controller shown in FIGS. 1 and 2, steering control lines 45 are threaded through the apertures 43 of steering control arm 42 and the plate 17 of the mounting means 15 is secured to the bottom of the boat as previously explained. The steering control lines extend to the stern of the boat in a selected conventional manner and are connected with an outboard motor or rudder. Thereafter, longitudinal movements of the steering control line will cause the boat to turn to the right or to the left. The grip 29 of the handle element 27 is grasped by the person controlling the boat and control arm 23 is moved forward or backward, with resulting forward or backward movements of the steering control line attachment arm 42 and steering control line 45.

In preparation for use, the handle element 27 is pushed down slightly and rotated clockwise as seen from above until the pin 35 is aligned with the length of slot 37. Then the pressure of the hand is released, allowing the handle element to move to its extended position.

When the boat controler is not in use, however, downward pressure is applied to the handle element 27 until the pin 35 reaches the upper extremity of slot 37. Then, the handle element 27 is rotated counterclockwise to lock the pin against the circumferential upper region 39 of slot 37. Therefore, the handle element becomes locked in its retracted position.

The reciprocating (here telescoping) action of my boat controller has the advantage that it may be conveniently moved to a nonobstructing position when not in use. This is a great convenience for fishermen, for example, since the otherwise obstructing controller can be moved below the gunnel 47 of a fishing boat when casting or using nets or when performing other fishing activities. During use (when the boat is being steered) the handle element can be easily moved to its extended position (shown in phantom in FIGS. 1 and 2) and the increased mechanical advantage obtained by the increased length of the controller decreases the effort required to steer the boat when contrasted with the effort required when the handle element is in the retracted position.

Moreover, the particular type attachment means 41 illustrated in FIGS. 1 and 2 has the advantage that the steering control lines may be moved to an out-of-the-way position in many boats, as is shown in FIGS. 1 and 2. Without the use of two arms (the steering control line attachment arm 42 and the control arm 27) the steering control lines 45 would probably be secured to the upper region of the control arm 23 where they would not only be visible but could possibly interfere with normal passenger activities. Hence, it is advantageous to utilize the two arm concept embodied in the boat controller of FIGS. 1 and 2.

Another form of my invention is illustrated in FIGS. 3, 4 and 5. This boat controller is similar in many respects to the one illustrated in FIGS. 1 and 2. It has, for example, mounting means 15 having a cylindrical housing 19, and a rotatable element 21 inside the cylindrical housing. A control arm 23 extends upwardly from the mounting means, being secured to the steering control line attachment arm 42. Handle element 27 is inserted within control arm 23 and has a grip 29 on its upper end. Locking means 33, which comprises the elongated slot 37, with its curved upper region 39, and pin 35 are included in the device so that the handle element may be locked in its retracted position or moved upwardly when unlocked with the assistance of compression spring 31. Steering control line attachment arm 42 has apertures 43 or other suitable means for attachment to the steering control lines 45. Also, a bracket member 44 is connected with rotatable element 21 to attachment arm 43 and to control arm 23.

In the boat controller of FIGS. 3, 4 and 5, however, an output plate 49 is secured to one end of a shaft 51 that is supported inside rotatable element 21 for rotation about its longitudinal axis. The output plate 49 has apertures 50 (see FIG. 5) therein or other suitable means for connection to the throttle control line (not shown) of a boat. A drive rod 53 is carried inside control arm 23, having limited axial movements by the placement of upper and lower collar 55, 57 on each end of a support cylinder 59 secured to a lower region of the control arm 23 by suitable means such as set screw 60. Lower collar 57 has a bevel gear 62 formed thereon for engaging a mating bevel gear 63 secured to the opposing end of the shaft 51 carried inside rotatable element 21. Thus, bevel gears 62, 63 together constitute gear means 66 such that rotation of drive rod 53 about its longitudinal axis causes rotation of the shaft 51 about its longitudinal axis backward. The gear means may be covered with a hood 64 for safety or to prevent foreign articles from jamming or damaging the gears.

The drive rod 53 extends upwardly into the interior of the handle element 27, and the engaged portions of these members have configurations such that mutual rotation of the handle element and the drive rod is effected when either is rotated about its longitudinal axis. In this particular instance, the drive rod is square as illustrated in FIG. 4 and slidably engages an extension sleeve 67 rotatable in and depending from the handle element 27. The extension sleeve extends upwardly through handle element 27 and is secured to a control knob 69 that may be rotated clockwise or counterclockwise to rotate extension sleeve 61, drive rod 53, shaft 51 and thus control plate 49 in selected directions.

The shaft 51 within rotatable element 21, output plate 49, with its apertures 50 to which are secured the throttle control lines, and the gear means 66 constitute connector means that communicate with drive rod 53 to connect the throttle control line with the drive rod.

The operation of the boat controller of FIGS. 3, 4 and 5 is identical with the operation of the boat controller of FIGS. 1 and 2 with respect to controlling the direction of travel of a boat. My modified form of boat controller, however, can be used to control the throttle of the boat, since the apertures of the control plate 49 may be secured to the throttle control lines (not shown) that are attached to the motor. To vary the throttle setting of the motor, the control knob 69 is rotated clockwise or counterclockwise to similarly rotate the extension sleeve 61, and eventually the output plate 49, as was explained previously. My modified boat controller, therefore, has the advantages explained above in connection with the boat controller of FIGS. 1 and 2 and, in addition, enables control over the velocity of the boat.

The specific geometric forms selected for illustration and description are given by way of example. The tubular form of control arm 23 and handle element 27 can be varied, for instance, since the telescoping action of these components is but one specific way to conveniently achieve a broader classification of action, which is reciprocation. Also, the steering control line attachment arm 42, and the mounting means 15 can have a variety of geometric forms since the principles of my invention may be utilized even though these and the other geometric forms are varied.

While I have shown my invention in only two of its forms, it should be apparent to those skilled in the art that it is not so limited, but is susceptible of various changes and modifications without departing from the spirit thereof.

I claim:
1. A boat controller for attachment to the steering control line of a boat, said controller comprising:
 (a) mounting means securable to said boat;
 (b) a rotatable element carried by said mounting means to pivot about a substantially horizontal axis;
 (c) a control arm connected with one end region of said rotatable element to extend upwardly from an interior region of said boat;

(d) a handle element reciprocally mounted to said control arm to move between extended and retracted positions;

(e) securing means interconnecting said control arm and said handle element to enable said handle element to be releasably secured in its retracted or extended position;

(f) attachment means connected with said control arm and extending upward along the length of the handle element in its retracted position for coupling the steering control lines of the boat therewith, whereby pivoting movements of said control arm effect movements of said steering control lines to steer said boat; and (g) a bracket member connected with the end of said rotatable element opposite the end connected with said control arm, said bracket member also being secured to an upper region of a selected one of said control arm and said attachment means to equalize force distribution.

2. The boat controller of claim 1 in which: the control arm is tubular and receives the handle element, which is also tubular; a resilient element is connected with said control arm and said handle element to urge said handle element toward its extended position; and a locking means is connected with said handle element and said control arm to lock said handle element in its retracted position.

3. A boat controller for attachment to the steering control lines of a boat, said controller comprising:

(a) mounting means securable to a lower region of said boat;

(b) a rotatable element carried by said mounting means to pivot about a substantially horizontal axis;

(c) a control arm connected with one end region of said rotatable element to extend upwardly from the lower interior region of said boat;

(d) a handle element reciprocally mounted to said control arm to move between extended and retracted positions; and (e) a steering control line attachment arm that is substantially planar and spaced apart from said control arm, with its upper region extending the substantial length of the handle element in its retracted position and being adapted to receive the steering control lines.

4. The boat controller of claim 3 in which: the control arm is tubular and receives the handle element, which is also tubular; a resilient element is connected with said control arm and said handle element; to urge said handle element toward its extended position; and a locking mechanism is connected with said handle element and said control arm to lock said handle element in its retracted position.

5. A boat controller for attachment to the steering control line and the throttle control line of a boat, said controller comprising:

(a) mounting means securable to said boat;

(b) a rotatable element carried by said mounting means to pivot about a substantially horizontal axis;

(c) a control arm carried by said rotatable element;

(d) attachment means connected with said control arm for coupling the steering control lines of the boat therewith, whereby pivoting movements of said control arm effect movements of said steering control lines to steer said boat;

(e) a handle means reciprocally and rotatably mounted within said control arm to move between extended and retracted positions;

(f) a drive rod carried by said control arm and extending into axially slidable engagement with a portion of the interior of said handle means, the engaged portions of said drive rod and said handle means having configurations to effect mutual rotation of said portion of handle means and said drive rod about their respective longitudinal axes when said portion of handle means is rotated about its longitudinal axis; and (g) connector means communicating with said drive rod to secure the throttle control line with said drive rod.

6. The boat controller defined by claim 5 wherein the connector means comprises a shaft secured for rotation about its longitudinal axis to said rotatable element; an output plate secured to one end of said shaft to connect said shaft with the throttle control line of the boat; and gear means connecting said drive rod with said shaft.

References Cited
UNITED STATES PATENTS

| | | | |
|---|---|---|---|
| 2,313,768 | 3/1943 | Putt | 74—522 X |
| 2,334,057 | 11/1943 | Ashton et al. | 74—525 |
| 2,514,212 | 7/1950 | Jennings | 74—544 X |

MILTON KAUFMAN, *Primary Examiner.*